Feb. 5, 1952 — L. A. PÁLFFY — 2,584,365
ELECTRIC MOTOR
Filed June 23, 1948 — 2 SHEETS—SHEET 2

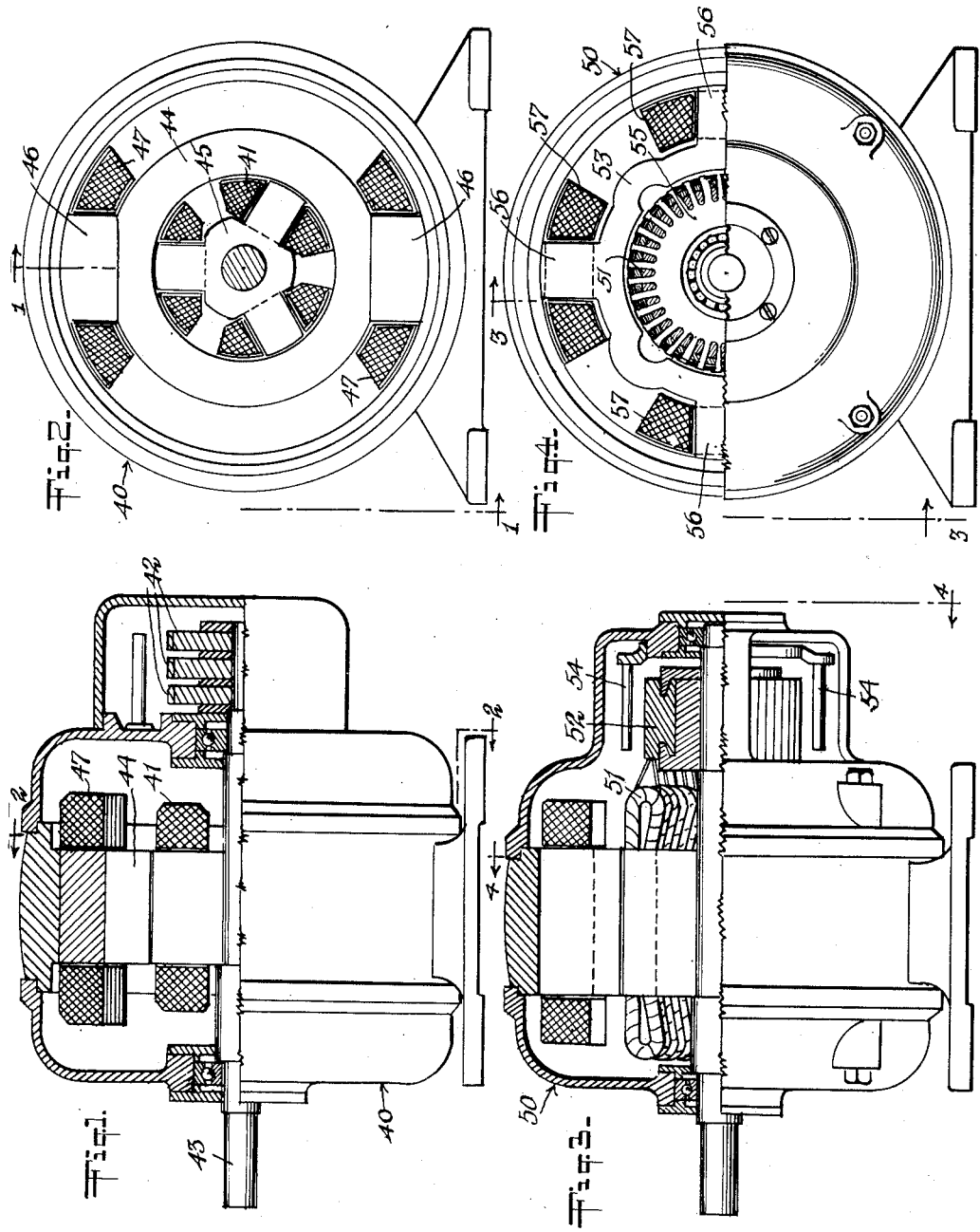

Inventor
L. Alphonso Pálffy
By
Munn, Liddy & Glaccum
Attorneys

Patented Feb. 5, 1952

2,584,365

UNITED STATES PATENT OFFICE 2,584,365

ELECTRIC MOTOR

L. Alphonso Pálffy, Kispest, Hungary, assignor to Albert Strojan, New York, N. Y.

Application June 23, 1948, Serial No. 34,720
In Hungary July 24, 1947

2 Claims. (Cl. 171—252)

This invention relates to an electric motor designed on a new principle, the characteristic feature of which is that either the stator or rotor are so constructed that they form closed magnetic circuits. In an electric motor of this type the magnetic flux created in the part creating a magnetic field may close not only through the other part of the motor as is the case in most conventional motors but also may close through the part of the motor creating the magnetic field. This results in the reduction of the magnetic leakage to a negligible amount, thereby resulting in a motor of high efficiency.

A further feature of the alternating current motor of the invention is that by providing rotors and stators of definite dimensions, the coils will not burn out even in the case where the motor comes to a halt due to overload.

Further advantages and unique features of my invention will be apparent as I proceed with the description.

Fig. 1 shows a front elevation partially in section of an alternating current motor incorporating my invention;

Fig. 2 is a sectional view on line 2—2 of Fig. 1;

Fig. 3 is a front elevation partially in section of a direct current motor incorporating my invention;

Fig. 4 is a sectional view on line 4—4 of Fig. 3; and

Figure 9:
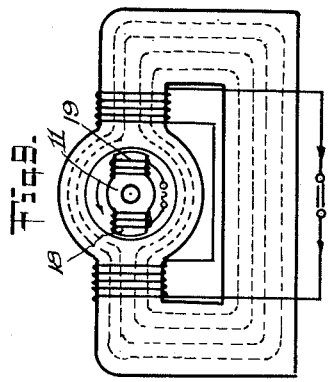

Figs. 5 to 10 inclusive show diagrammatic views illustrating the principle of operation of my invention.

As shown in Figs. 5 to 9 my motor 10 consists of a rotor 11 having a pair of magnetic poles 12 and 13 and a stator 14 which is formed in the shape of a ring surrounding the rotor 11 in the plane of its rotation. In addition, a yoke 15 connecting two diametrically opposite points of the ring is provided. Positioned around the yoke 15 at the points where it joins the ring 14 are exciting coils 16 and 17 which in their preferred form will be supplied with direct current. The rotor 11 is likewise provided with a pair of coils 18 and 19 connected in series which will be supplied with alternating current that will drive the motor. The exciting coils 16 and 17 are connected in series and their windings are so designed that both coils will create a magnetic flux of the same direction in the stator 14. Obviously, it would also be possible to connect these windings in parallel if so desired. The coils 18 and 19 of the rotor 11 are likewise connected either in series or in parallel so as to create a magnetic field of the same direction in the rotor 11. By placing the exciting coils 16 and 17 of the stator 14 on that part of the yoke 15 where it joins the ring, the flux leakage is held to a minimum. Thus it will be seen that the stator is in the form of a closed magnetic means or path formed with spaced parallel portions along its length and with a rotor disposed between and in the plane of said parallel portions. Exciting coils may be disposed on the rotor and on the magnetic path on opposite sides of the spaced parallel portions.

The yoke 15 connecting opposite parts of the ring may be made of cast iron or of laminated iron, whereas the rotor 11 bearing the coils fed by the alternating current, and the ring portion of the stator 14 are preferably made of laminated iron so as to reduce iron losses. In order to obtain the highest possible load capacity and efficiency of the motor it is important that the sections of the iron parts of both the stator 14 and the rotor 11 have their permeability carefully computed. It has been found that the joint total of the permeance of both sides of the ring should be equal to the permeance of the main section 20 of the yoke 15. Such a result is best obtained by designing the joint total section of both sides of the ring to be equal to the sections of the yoke where it joins the ring.

It has also been found advantageous to choose the dimensions of the ring, the joining yoke parts and of the main section of the yoke, so that the main section 20 of the yoke 15 should exceed the joint total section of both sides of the ring or the sections of either of the joining yoke parts by approximately 10 to 20 percent.

Figure 5:
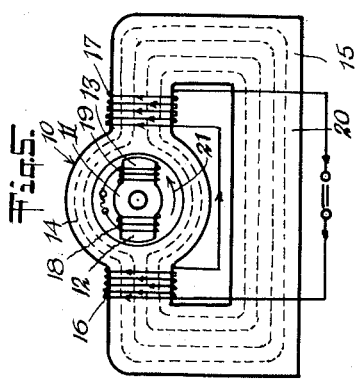

In describing the operation of the motor 10 as illustrated in Figs. 5 through 9, a magnetic flux is created in the stator 14 and will close through both sides of the ring when the coils 16 and 17 are energized. Fig. 5 shows the position of the rotor 11 when the value of the alternating electromotive force in the coils 18 and 19 is zero so that no current will flow through these coils.

Figure 6:
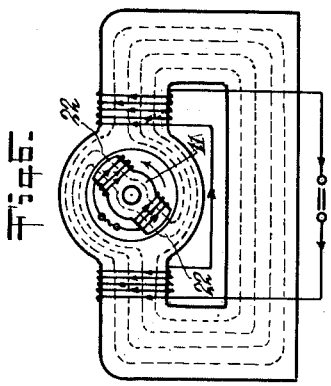
Figure 7:
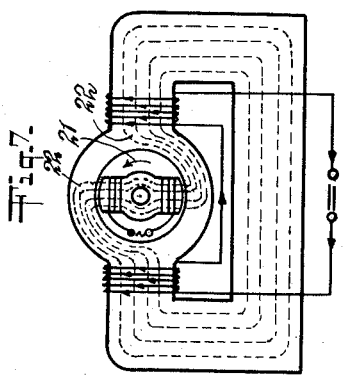

As shown in Fig. 6 when the initial cycle of alternating voltage is supplied to the coils 18 and 19, it will create a gradually increasing current which will magnetize the rotor and the rotor 11 leaves the position as shown in Fig. 5, and will start to move in the direction shown by the arrow 21. As the current is gradually increased in the coils 18 and 19, the rotor will be magnetized and at the same time the rotor 11 will also be absorbing a portion of the lines of force created in the stator 14 which will follow a path through the rotor 11 as indicated by the dotted lines 22. As the rotor 11 continues to turn until it reaches a position shown in Fig. 7, the magnetic lines of force 22 closing through the rotor 11 will continue to shorten and will impart accordingly a torque in the direction of the arrow 21. In Fig. 7 the current flowing in the coils has reached its peak value and all of the lines of force entering the ring will close through the rotor and cause the torque imparted to the rotor to reach its maximum value.

Figure 8:
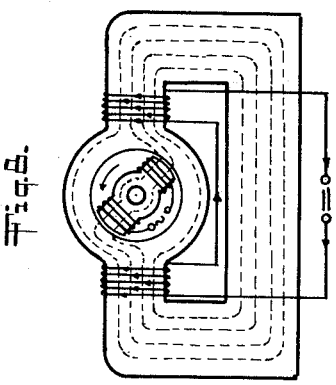

In the position of the rotor as shown in Fig. 8, the intensity of the current flowing in the coils has diminished and accordingly only a portion of the lines of force will close through the rotor, the remaining lines of force passing through the ring. This also results in a decrease in the amount of torque imparted to the rotor.

As shown in Fig. 9, the value of the alternating electromotive force will be reduced to zero so that all of the lines of force will close through the ring. At this point the second cycle of the alternating voltage will commence and will excite a current in the opposite direction in the coils 18 and 19. As the polarity of the stator which is excited by direct current remains unchanged, the whole process will repeat itself in the manner as described above until the rotor regains the position as shown in Fig. 5. The motor 10 will also operate the same way if the direct current is fed to the rotor and the alternating current to the coils of the stator. In this case it is the stator which should be made of laminated iron and the rotor which may be of cast iron. However, the first mentioned arrangement would be preferred as it is more advantageous to excite by alternating current the part which possesses a smaller volume of iron.

It follows from the foregoing why it is advisable to choose the dimensions of the different parts of the stator and of the rotor so that their permeability would satisfy their proportions as established above. The main section 20 of the yoke should be chosen in relation to the sections of the ring joining parts and to the total amount of the sections on either side of the ring in a way so that the magnetic intensity of the ring or of the parts may reach the usual 17,000 to 21,000 gauss. However, the degree of density of the yoke should not reach such high values, as this would result in an excess of excitation input which would prove disadvantageous to the efficiency of the motor.

Figure 10:
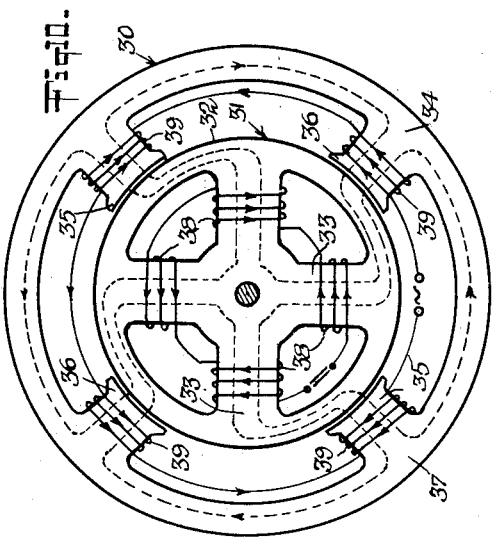

In Fig. 10 I show a four-pole motor 30 embodying my invention in which the rotor 31 forms a closed magnetic circuit. The rotor 31 consists of a ring 32 provided with two diametrical ribs 33, whereas the stator 34 is comprised of two pairs of magnetic poles 35 and 36 and a yoke 37 connecting the magnetic poles. On each of the diametrical ribs 33 of the ring there are two exciting coils 38 supplied with direct current, while the coils 39 of the stator 34 are supplied with alternating current to drive the motor 30. The coils of both the stator and the rotor may be connected in series or in parallel, and the direction of their winding is to be chosen in a way as to impart the same polarity to the poles arranged opposite each other, and the same polarity should also be given to both ends of either of the diametrical ribs. As can be seen the arrangement is similar to those shown in Figs. 5 to 9 except that the ring is separated from the yoke and is united with the rotor. As to the dimensions of the sections the same rules are to be applied as previously set forth. The total sections of both sides of the ring should be equal to the section of the ribs, whereas the section of the yoke should amount to at least one side of the ring.

In Figs. 1 and 2 I have shown an embodiment of my invention in an alternating current motor 40 in which the stator forms a closed magnetic circuit. The rotor coils 41 are supplied with alternating current through conventional slip rings 42 that are mounted on the shaft of the motor 43. The stator 44 is ring-shaped and entirely surrounds the rotor 45 in the plane of its rotation. In addition, the poles 46 of the stator 44 are provided with coil windings 47 to which direct current would be supplied.

In Figs. 3 and 4 I have shown a direct current motor 50 embodying my invention in which the rotor winding 51 is connected to commutator bars 52 in the conventional manner, and the stator 53 forms a closed magnetic circuit. Furthermore, current will be supplied to the winding 51 through brushes that would be mounted on the brush arms 54. The stator 53 is ring shaped and totally surrounds the rotor 55 in the plane of its rotation. The stator 53 is also provided with a plurality of poles 56 that are equipped with coil windings 57 to provide the excitation current.

While the invention has been described in detail with respect to a present preferred form which it may assume, it is not to be limited to such details and form since many changes and modifications may be made in the invention without departing from the spirit and scope of the invention in its broadest aspects. Hence, it is desired to cover any and all forms and modifications of the invention which may come within the language or scope of either or both of the appended claims.

I claim:

1. An electric motor which comprises a stator formed as a closed ring of magnetic material forming two parallel magnetic paths, a yoke connected to opposite sides of said ring and forming therewith a closed magnetic current, a rotor disposed within said ring and rotatable in the plane thereof, the total permeance of the two parallel magnetic paths forming the ring being equal to the permeance of the yoke at the point where it joins the ring.

2. An electric motor which comprises a stator formed as a closed ring of magnetic material forming two parallel magnetic paths, a yoke connected to opposite sides of the ring and forming therewith a closed magnetic circuit, a rotor disposed within said ring and rotable in the plane thereof, the total permeance of the two parallel magnetic paths forming the ring being equal to the permeance of the yoke at the point where it joins the ring, exciting coils around the stator on opposite ends of the yoke adjacent opposite sides of the ring, and exciting coils on opposite sides of the rotor.

L. ALPHONSO PÁLFFY.

REFERENCES CITED

The following references are of record in the file of this patent:

UNITED STATES PATENTS

| Number | Name | Date |
|---|---|---|
| 470,179 | Kennedy | Mar. 8, 1892 |
| 730,891 | Eickemyer | June 16, 1903 |
| 1,223,449 | Turbayne | Apr. 24, 1917 |
| 1,546,269 | Warren | July 14, 1925 |
| 1,917,289 | Benson | July 11, 1933 |
| 1,922,216 | Persons | Aug. 15, 1933 |
| 1,978,100 | Buerke | Oct. 23, 1934 |